July 7, 1964 C. W. FOSTER ETAL 3,139,660
STRUCTURAL DISCONNECTION APPARATUS
Filed April 20, 1961 2 Sheets-Sheet 1
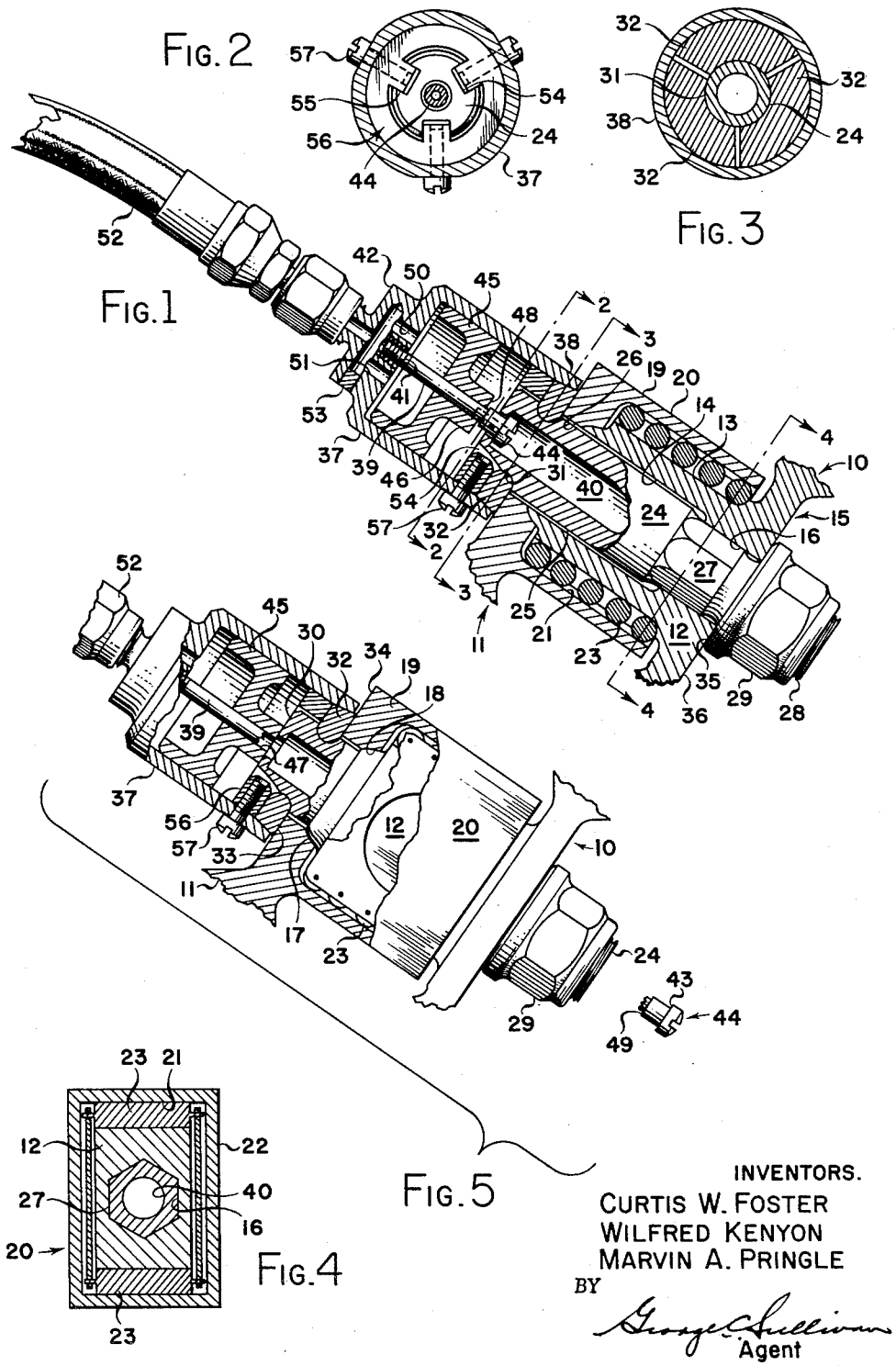
INVENTORS.
CURTIS W. FOSTER
WILFRED KENYON
MARVIN A. PRINGLE
BY
George C. Sullivan
Agent

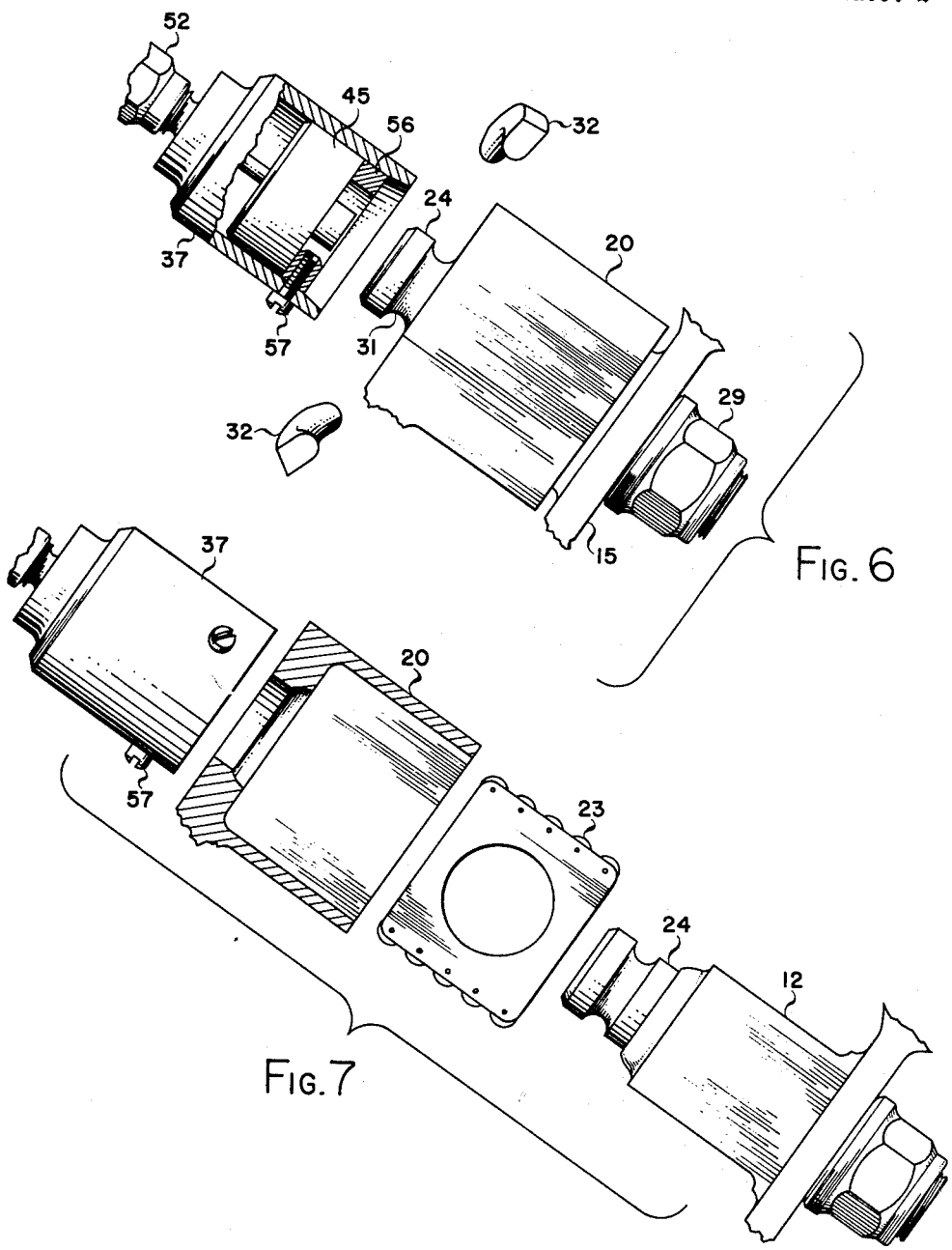

United States Patent Office 3,139,660
Patented July 7, 1964

3,139,660
STRUCTURAL DISCONNECTION APPARATUS
Curtis W. Foster, North Hollywood, Wilfred Kenyon, Santa Monica, and Marvin A. Pringle, La Canada, Calif., assignors to Lockheed Aircraft Corporation, Burbank, Calif.
Filed Apr. 20, 1961, Ser. No. 104,272
1 Claim. (Cl. 24—211)

The present invention relates to structural disconnection apparatus and, more particularly, to structural apparatus for joining two or more structural members together with normal load-bearing capacity during normal operation and providing quick disconnection of such members upon actuation, such disconnection occurring with integrated initial guidance whereby other structures or members extending between the two structural members will be separated and/or broken in a guided manner.

The use of high speed vehicles, such as aircraft and missiles of the space age, has given rise to a severe problem in the field of escape and/or recovery of a portion of such vehicle. For example, during powered flight, the previously developed methods of ejection of a pilot from the vehicle have become impractical because the deceleration may cause death or at least blackout so as to incapacitate the pilot for intelligent maneuvering and/or other survival action. Furthermore, the altitude and speed of the vehicle at the time of ejection may be so extreme that the ejected package (whether human or instrumentation) cannot withstand the environmental conditions. Still further, predetermined ejection of the package at the termination of powered flight and/or arrival at a particular target point (the word "target" being used in the planned sense rather than necessarily the military sense) may not be attainable because of the presence of other factors not related to a particular desired time of ejection.

In order to solve some or all of these problems, one of the contemplated solutions has been to separate a desired portion of the vehicle from the power portion of the vehicle, such desired portion containing the human or instrument package. Thus, such desired portion may contain all or most of the necessary apparatus and facilities needed to sustain life and, generally, prevent the untoward occurrence of events normally associated with the sudden application of extreme environmental conditions (including deceleration) upon the package. Such portion (hereinafter referred to as a capsule) may be guided, restrained, or otherwise treated as an independent entity after separation from the power and other portions of the original vehicle and may be retrieved or recovered in its entirety or may serve as only an escape capsule until the extreme environmental conditions are no longer present whereupon the capsule may be ejected therefrom.

In order to provide a capsule which can serve as an integral part of the vehicle during normal operation thereof and, upon actuation, also serve as a separate and independent vehicle, the capsule must be securely connected to the remainder of the powered vehicle with structural load-bearing members which, upon actuation, can be readily broken, severed and/or disconnected to achieve the separability function. Further, bearing in mind that the capsule ideally should be as small as possible and contain as few of the normal flight components of the composite vehicle as possible, there are many interconnected control lines, cables, ducts, and other devices interconnecting the capsule with the remainder of the vehicle, and these interconnections also must be severed.

From a conceptual standpoint, there are two complicating primary problems related to disconnection apparatus, namely, strong structural members are difficult to rapidly disconnect and, conversely, rapid disconnection apparatuses generally are too weak to bear the normal flight loads. To these factors must be added the problem of assuring smooth and complete severance of the capsule and its connecting components from the vehicle.

Therefore, the primary objects of the present invention are the provision of means for structurally joining structural members of a capsule or other portion of a vehicle to the remainder of the vehicle with sufficient strength to withstand all normal flight loads, means for quickly disconnecting such members upon actuation so as to permit separation of the capsule from the vehicle, and means for performing such disconnection in a manner to permit proper separation of all lines, cables, ducts, and other interconnecting devices between the vehicle and the capsule during such disconnection.

It is another object of the present invention to provide structural disconnection apparatus having extreme reliability and compactness.

According to the present invention, structural disconnection apparatus is provided with a bolt and bolt-engaging means for carrying flight tension loads and spherical fitting members for carrying shear, torsion and compression flight loads, such bolt-engaging means being caused to release said bolt during the initial disconnection stage, such spherical members being caused to separate during a subsequent disconnection stage, and including antifriction guidance means for carrying shear and torsion loads during subsequent and final disconnection stages.

The features of the present invention which are believed to be novel are set forth with particularity in the appended claim. The present invention, both as to its organization and manner of operation, together with further objects and advantages thereof, may best be understood by reference to the following description, taken in connection with the accompanying drawings, in which, FIGURE 1 is a side elevation view, partly in section, of apparatus in accordance with the present invention, shown in the structural load-bearing position;

FIGURES 2, 3 and 4 are sectional views of the apparatus shown in FIGURE 1, as seen along lines 2—2, 3—3 and 4—4, respectively; and FIGURES 5, 6 and 7 are partially exploded side elevation views, partly in section, and similar in aspect to FIGURE 1, showing successive stages of disconnection of the apparatus.

Referring to the drawing, reference numeral 10 generally designates the capsule fitting which is secured to, or forms an integral part of an escape capsule (not shown) or other structural apparatus desired to be selectively releasably connected to other apparatus. Reference numeral 11 generally designates a mating fitting which may be secured to or an integral part of the fuselage of an aircraft, missile or other vehicle or apparatus to which the capsule or other device is connected. The capsule fitting 10 has a body portion 12 with a rectangular configuration for its outer surfaces 13 and a cylindrical bore 14. The base portion 15 of the capsule fitting 10 has an internal surface 16 of hexagonal cross section in central alignment with the cylindrical bore 14 of the body portion 12. The capsule portion 10 is provided with a spherical end surface 17 for smoothly abutting against a mating spherical surface 18 on the base portion 19 of the fuselage fitting 11. The body portion 20 of the fuselage fitting 11 has cross-sectionally rectangular surfaces, both internally 21 and externally 22. A plurality of roller bearings 23 constitute an anti-friction guidance assembly and are inserted into the open end of the fuselage fitting body portion 20 to fit between the outer surface 13 of the capsule fitting body portion 12 and the inner surface 21 of the fuselage fitting body portion 20 to provide anti-friction guidance in a rectilinear direction parallel to the axis of the bore 13 when such fittings separate during the disconnect operation of the apparatus.

The bolt member, indicated generally at 24, has a cylindrical shank 25 contained by the cylindrical bores 14 and 26 of capsule and fuselage fittings 10 and 11, respectively, and also has a hexagonal portion 27 received in non-rotatable relationship by the hexagonal surface 16 of the capsule fitting 10. The threaded end 28 of the bolt 24 receives a nut 29 which, when tightened, draws the spherical surfaces 17 and 18 of the respective capsule and fuselage fittings 10 and 11 together into load-bearing engagement with each other.

The bolt head 30 has a cylindrical cross section of the same diameter as the cylindrical shank 25 and is provided with an annular groove 31 for circumferentially receiving a plurality of bolt-head segments 32. It should be understood that the segments 32 constitute the effective head end of the bolt 24 for retaining the fittings 10 and 11 in structural engagement with each other. Thus, the surfaces 33 of the three segments 32 abut against the forward surface 34 of the fuselage fitting base portion 19, and the surface 35 of nut 29 abuts against the rear surface 36 of the capsule fitting 10, whereby tightening of the nut 29 on the bolt 24 causes fittings 10 and 11 to be drawn together. As illustrated, the annular groove 31 and the bolt-head segments 32 have mating curvatures to cause a partial resolution of axial tension forces into radial forces for facilitating the removal of the segments 32 from engagement with the bolt 24 during the disconnection operation. In order to prevent the segments 32 from becoming so disengaged during normal structural operation of the apparatus, a dual purpose cylinder 37 is disposed with its ring end portion 38 around the segments 32. The ring portion 38 has sufficient strength to withstand the radial forces exerted during normal operation.

In order to maintain the cylinder 37 in its axial relationship to the bolt-head segments 32, a retaining screw 39 is passed through a central bore 40 within the bolt 24. The threaded end 41 of the screw 39 is threadably connected to the base portion 42 of the cylinder 37, and the shoulder 43 of its head end 44 is seated against an annular flange of the bolt 24 within its bore 40.

The disconnection actuation apparatus includes a piston 45 reciprocable within the cylinder 37 and having a forward extension 46 adapted to seat against the bolt head end 30. The piston 45 has a central bore 47 for receiving the retaining screw 39. The driving surface 48 of the piston 45 is adapted to abut against a shoulder 49 of the retaining screw head 44 so that, upon initial actuation, to be described hereinafter, the screw head 44 will be broken off to release the cylinder 37 from its engaged position about the bolt-head segments 32. As illustrated, the screw head portion 44 may have a failure section to facilitate such breaking. The cylinder base portion 42 is provided with a pair of ports 50 and 51 communicating between the internal chamber of the cylinder 37 and a conduit or hose 52 which is connected to a source (not shown) of gas or fluid under selectively actuated or released pressure for initiating the disconnection operation of the apparatus. A plug 53 is removable during the assembly of the apparatus to free the piston 45 from any back-pressure during tightening of the retaining screw 39.

Since the threaded end 41 of the retaining screw 39 is secured to the base portion 42 of the cylinder 37, the cylinder should not be permitted to rotate with respect to the bolt 24 or else the retaining screw head 44 may be broken accidentally. Therefore, the bolt head 30 is provided with a plurality of circumferentially displaced peripheral notches 54 into which a corresponding number of radially inward projections 55 of a torque ring 56 are fitted. A plurality of machine screws 57 are passed through the cylinder 37 and threadably secured to the torque ring 56 and, thus, effectively to the bolt 24 to prevent rotation of the cylinder 37 with respect to the bolt 24.

During normal operation, the illustrated apparatus functions as a structural joint, with the bolt 24 carrying the tension loads, and the fittings 10 and 11, through their tightly joined respective spherical surfaces 17 and 18, carrying the shear, torsion and compression loads. Hence, the guidance roller bearings 23 do not carry any loads during normal operation, thus preventing hardening or other fatigue factors which might cause later disconnection problems.

Upon actuation, gas or other fluid passes through the ports 50 and 51 into the chamber of the cylinder 37 and forces the piston 45 against the retaining screw head 44 to cause same to break off, as shown in FIGURE 5. The forward surface 48 of the piston 45 then bears against the bolt end 30. Since, at this point, the bolt 24 is not free to move, the pressure gas causes the cylinder 37 to move away from the bolt 24, thus removing the end ring portion 38 of the cylinder 37 from engagement about the bolt head segments 32. It may be noted that the torque ring 56 moves away with the cylinder 37, and that the notches 54 in the bolt head end 30 do not prevent axial movement of the torque ring assembly with respect to the bolt 24. With the removal of the ring portion 38, the bolt head segments 32 are free to be forced out of engagement with the annular locking groove 31 in the bolt head end 30 by the tension in the bolt, which action takes place instantly and as illustrated in FIGURE 6. The fittings 10 and 11 now are free to separate and, in the particular embodiment illustrated, the bolt 24 serves no further purpose.

As the body portions 12 and 20 of their respective fittings 10 and 11 separate from each other, the withdrawal of the body portion 12 from within the body portion 20 is guided in an axial direction by the guidance roller bearings 23. Since the spherical surfaces 17 and 18 are no longer in engagement, the shear and torsion loads during separation are taken by the roller bearings 23. Hence, any lines, cables, hoses, ducts and other devices interconnecting the two separating portions of the vehicle or other apparatus will be permitted to separate due to the application of tension without shear and/or torsion load factors. Obviously, with such controlled tension separation, all of such other interconnectors may contain greatly simplified breakaway couplings, or none at all in some cases. The length of guided travel of the male portion 12 within the female portion 20 may be as long as needed to insure complete disconnection of all other interconnectors.

While a particular embodiment of the present invention has been shown and described, it will be obvious to those skilled in the art that changes and modifications may be made without departing from this invention in its broader aspects, and therefore, the aim in the appended claim is to cover all such changes and modifications as fall within the true spirit and scope of this invention.

What is claimed is:

Structural disconnection apparatus for structurally joining two structural members and selectively permitting guided disconnection thereof comprising: a pair of structural guidance members, each adapted to be secured to a respective one of such structural members, one of said guidance members having a spherically concave surface, the other of said guidance members having a spherically convex surface in engagement with said concave surface; a bolt having an end head passable through at least one of said guidance members; said end head provided with an annular groove; a plurality of bolt head segments removably disposed in said groove and radially extending from said bolt, said segments being axially engageable between said end head and one of such structural members; a cylinder having an open end and a closed end, said open end being in peripheral axially-removable engagement with said segments for maintaining radial engagement of said segments with said bolt; retainer means effectively connected between said bolt and said cylinder for preventing axial movement of said cylinder with respect to said segments; a piston reciprocably disposed within said cylinder and adapted to axially bear against said end head; selectively actuatable power means coupled to said piston for causing said piston to exert sufficient axial force to release said retainer means and axially remove said cylinder from engagement with said segments; said guidance members each having a body portion parallel to the axis of said bolt and to each other, one of said body portions being laterally encompassed by the other of said body portions; and bearing means disposed between and in anti-friction engagement with said body portions of said guidance members whereby relative disconnecting movement of said guidance members is anti-frictionally guided by said bearing means and body portions.

References Cited in the file of this patent

UNITED STATES PATENTS

| | | |
|---|---|---|
| 2,475,661 | Dath | July 12, 1949 |
| 2,478,019 | Sonntag | Aug. 2, 1949 |
| 2,763,451 | Moran | Sept. 18, 1956 |
| 2,959,443 | Welch | Nov. 8, 1960 |
| 2,974,911 | Damiani | Mar. 14, 1961 |
| 3,053,131 | Stott | Sept. 11, 1962 |

FOREIGN PATENTS

| | | |
|---|---|---|
| 821,445 | Great Britain | Oct. 7, 1959 |
| 90,902 | Norway | Dec. 7, 1957 |
| 158,657 | Sweden | Apr. 16, 1957 |